United States Patent [19]

Dohan et al.

[11] Patent Number: 4,765,702
[45] Date of Patent: Aug. 23, 1988

[54] GLASS INTEGRATED OPTICAL COMPONENT

[75] Inventors: Luc Dohan, Fontainebleau; Carlos Nissim, Vulaines, both of France.

[73] Assignee: Corning Glass Works, Corning, N.Y.

[21] Appl. No.: 803,256

[22] Filed: Dec. 2, 1985

[30] Foreign Application Priority Data

Dec. 18, 1984 [FR] France ............................ 84 19328

[51] Int. Cl.⁴ ............................................. G02B 6/10
[52] U.S. Cl. .................................. 350/96.12; 350/96.17
[58] Field of Search ............... 350/96.11, 96.12, 96.13, 350/96.20, 96.34, 96.17

[56] References Cited

U.S. PATENT DOCUMENTS

| | | | |
|---|---|---|---|
| 4,273,445 | 6/1981 | Thompson et al. | 350/96.11 |
| 4,367,013 | 1/1983 | Guerder et al. | 350/96.34 |
| 4,400,052 | 8/1983 | Alferness et al. | 350/96.12 |
| 4,466,696 | 8/1984 | Carvey | 350/96.20 |
| 4,637,681 | 1/1987 | Yamamoto et al. | 350/96.11 |

*Primary Examiner*—William L. Sikes
*Assistant Examiner*—Robert E. Wise
*Attorney, Agent, or Firm*—Walter S. Zebrowski

[57] ABSTRACT

An integrated optical component including a monolithic glass body having a surface in which at least one cavity is molded. An optical circuit path, which is formed in the surface by ion exchange, is aligned with the cavity.

7 Claims, 2 Drawing Sheets

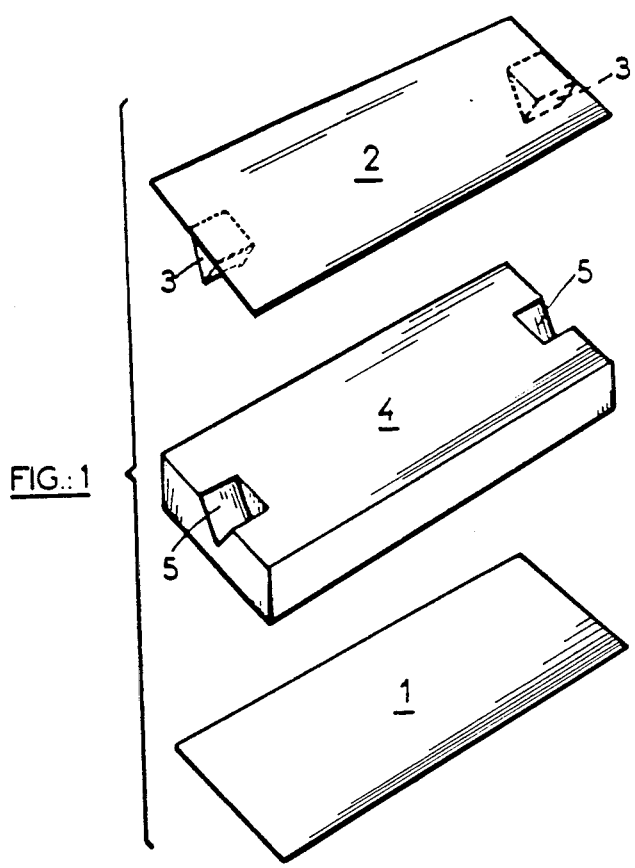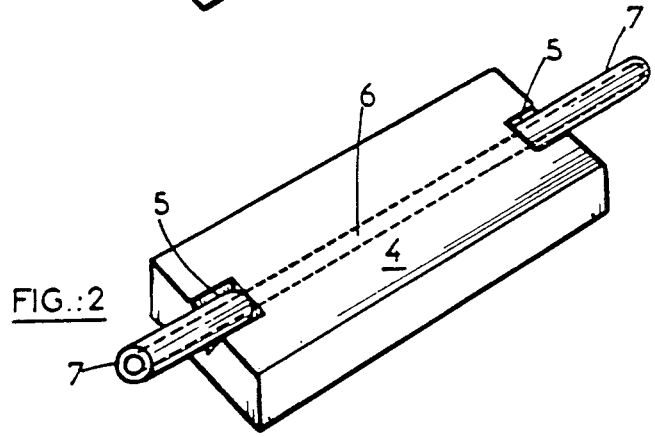

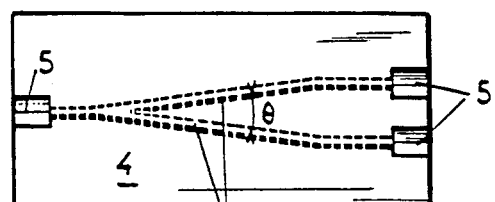
FIG.:3
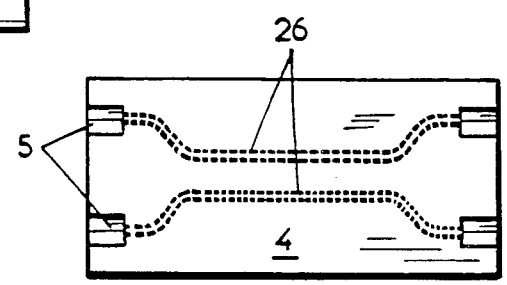
FIG.:4
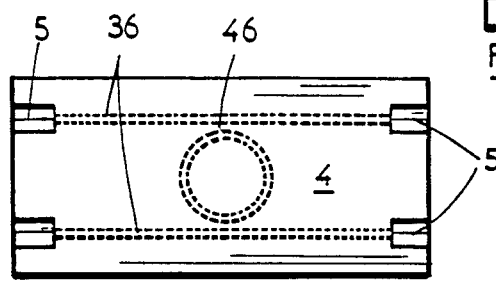
FIG.:5
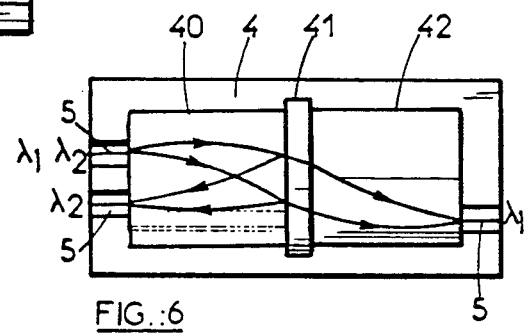
FIG.:6
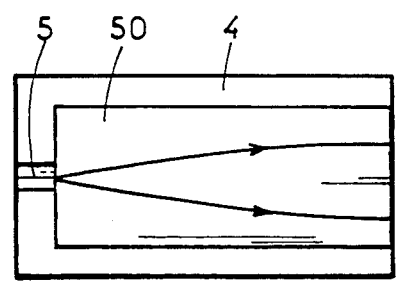
FIG.:7
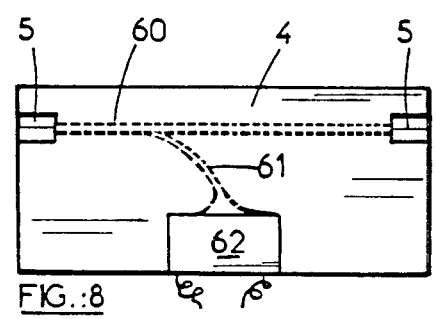
FIG.:8

GLASS INTEGRATED OPTICAL COMPONENT

BACKGROUND OF THE INVENTION

The invention concerns integrated glass optical components. The development of optical waveguide communication technologies has led to the design of new optical or opto-electronic components the function of which is to process optical signals leaving or entering optical fibers. Passive optical components can be distinguished from the active ones that include opto-electrical conversion relying on opto-electronic, opto-magnetic or opto-thermal effects.

Passive components include (a) connectors, which connect two fibers with minimum loss, (b) couplers which connect at least three fibers and split the power between the different fibers, and (c) couplers/multiplexers which split power between various fibers and select certain wavelengths.

Active components include the coupler/monitor which taps a small fraction of the power propagating in an optical fiber, the coupler/amplifier, the opto-electronic converter and switches or modulators. The first three types contain at least one "active element" such as a photodiode to ensure the opto-electrical conversion.

Components are also characterized according to whether single-mode or multimode propagation occurs in the optical path.

A large number of technologies have been proposed to make these components. Classical optical technologies have been employed, sometime down-scaled, to manufacture these active or passive components. Good performances have been achieved; however, these technologies are costly because the various elements have to be aligned with tolerances better than a micron, an alignment which is quite difficult to achieve.

For passive components, it is possible to use fiber fusion or fiber lapping technologies that allow coupling between fibers. These technologies, which are delicate to put into practice, do not apply broadly. It is difficult for instance to produce couplers with a large number of ports. Control of the coupling ratio is also difficult. Also, the integration of active components is practically impossible.

Another technology which has been proposed is planar integrated optics. This technology involves the generation of optical waveguides in a dielectric material by creating higher index zones for conducting light. The equivalent of an optical "printed circuit" can be made that way. Materials such as glass, Si, AsGa, or LiNbO$_3$ have been proposed. Single-mode or multimode guides can be formed at the substrate surface. Such guides can be obtained by diffusion or implantation of ions which increase the index of the substrate (eg: $K^+$, $Ag^+$, $Tl^+$ in glasses, Ti in LiNbO$_3$) or by forming on the substrate layers having a larger index (Si, AsGa). Glasses are interesting because they are cheap and because it is easy to diffuse therein strong polarisability ions, thereby creating surface or buried waveguides. The diffusion process can take place using a molten salt bath technique well known in chemical tempering (see for instance: J. Goell and al. Bell System Tech. J. Vol. 48, p. 3445/3448 (1969) and H. Osterberg and al., J. of Opt. Soc. of America, vol. 54, p. 1078/1084 (1964). The molten salt bath diffusion technique offers the advantage of control of the refractive index of the guide by adjusting the strong polarisability ion concentration in the bath. Guide losses can be decreased by burying it below the glass surface. This can be accomplished by carrying out a second ion exchange step in a molten salt bath containing the ions initially present in the glass (or ions having lower polarisability) in the presence of an electrical field. The surface guide will migrate inside the substrate. U.S. Pat. No. 3,880,630 describes such a technology. This buried guide technology allows the fabrication of interesting components, couplers in particular, having good performance in the laboratory (see for example Nippon Sheet Glass technical report 1/1983 pages 3-6).

One of the most difficult problems to be solved for integrated optics is the mechanical positioning, with a tolerance of one micron or less, of fibers, sources or detectors on the integrated component. In the lab one can glue with epoxy resin the fiber on the component. It is a time consuming and delicate operation which is difficult to scale up industrially.

Optical fibers have been aligned with respect to an integrated optics circuit path by forming a groove in the substrate adjacent the end of the path. Such devices have had various disadvantages.

V-grooves can be accurately formed in silicon by crystallographic etching, a technique taught in U.S. Pat. No. 3,774,987. However, an optical waveguide path, to be effective, must be on a substrate or layer having a refractive index lower than that of the waveguide. Since silicon and similar materials that can be subjected to crystallographic etching have a high refractive index, they must be provided with a layer of low index material on which the waveguide path can be formed. In such a device the substrate material is expensive, and the process of adding a low index material to the surface further increases the cost.

U.S. Pat. No. 4,240,849 teaches that V-grooves can be formed in a plaastic substrate by molding or formed in a glass substrate by the so-called ultrasonic cutting method. Layers of plastic are then built up on the substrate to form an optical path that is aligned with optical fibers that have been cemented into the grooves. Such plastic materials result in lossy optical waveguides. Even if a glass optical path were deposited on the surface of a substrate, deposition techniques that must be employed result in relatively lossy waveguides, and such techniques are often limited to the formation of single-mode waveguides because of the minimal thickness of material than can be deposited. While grooves can be accurately positioned in a plastic substrate by molding, various properties of plastic render it undesirable for use as an optical waveguide material. The formation of grooves by ultrasonic cutting is too costly to be a commercially viable process, and grooves formed by that technique cannot be positioned with an accuracy of one micron.

SUMMARY OF THE INVENTION

It is therefore an object of the present invention to provide an integrated optical component which overcomes the aforementioned disadvantages of the prior art. Another object is to provide a glass integrated optical component wherein grooves or cavities therein are located with extremely high precision. Yet another object is to form a device of the aforementioned character from a glass having a composition such that its softening point is sufficiently low that cavities can be precision molded therein and yet optical paths can be formed therein by ion exchange, whereby monolithic construction is possible.

More specifically, the invention concerns an integrated optical component comprising a monolithic glass body, including at least one optical circuit, characterized by the fact that the glass body exhibits, at least on one of its faces, aligned with the optical circuit, a profiled cavity that has been molded into that surface. Further, the optical circuit is formed in the surface by ion exchange, whereby an optical device situated in the cavity is optically aligned with the circuit path. The optical circuit thus formed comprises the same constituents as the glass body and further includes ions which increase the refractive index thereof to a value greater than that of the glass body.

In a preferred embodiment, the profiled cavity is a V-groove. However, depending upon the type of application, the integrated optical component can include other shapes of cavities to accurately position optical parts such as a filter, a detector, for instance a photodiode crystal, or a light source such as a laser crystal.

The optical circuit can be located at the surface, but it is preferably buried in the glass substrate. Obviously it can have many configurations depending upon the function of the component.

The cavities in the glass body can be made by the high precision molding process described in European Patent Application No. EP-A.0078658, which teaching is cited here for reference. U.S. Pat. Nos. 4,447,550 and 4,433,062, and British patent application GB A No. 2.069,994 disclose optical glass compositions which are particularly suited for such high precision molding. After pressing or molding, the molded body is submitted to the optical circuit generation steps, for instance by the process described in previously cited U.S. Pat. No. 3,880,630.

Only a high precision molding process, such as the one described in EP-A-0078658, can lead to a satisfactory result. Cavities, such as V-grooves, have to be positioned with tolerances better than one micron. On the other hand, the cavity endfaces, for instance the triangular endface of the V-groove, have to be plane and perpendicular to the cavity axis with a precision better than 30" of arc. The surface quality of this face has to be such that no light loss would occur by diffusion or scattering. A surface rugosity better than 0.05 micron has been achieved on these faces.

The glass from which the component is made preferably satisfies certain criteria in order to be fully acceptable.

The refractive index of the glass should preferably be close to the index of the cladding of the optical fiber used in order to optimize coupling. As the cladding of most high quality fibers is made of silica, the refractive index of the glass should be close to the index of silica, i.e. about 1.46.

In the preferred case of the buried optical circuit, the glass should contain alkaline ions such as $Na^+$, $K^+$, $Li^+$, etc. in order to be subjected to the double ion exchange process to produce the buried waveguides.

The glass should contain a minimum quantity (less than a few 10 ppm) of metallic ions, such as $Fe^{3+}$ or $Cu^{2+}$, or hydroxyl ions $OH^-$ that reduce light transmission.

The glass should exhibit a good durability, particularaly in the presence of the molten salts bath used in the process to geneate the optical circuit.

The glass should possess transformation temperatures as low as possible in order to be molded at the lowest possible temperatures. These low temperatures allow an acceptable life to the costly high precision molds as well as being critical in achieving the required high reproducibility. Generally speaking, these glasses must exhibit a softening point below about 500° C. and preferably below 450° C. Examples of such glasses are the fluorine containing glases such as the fluorophosphates or the fluoroborosilicates. The latter are preferable becasue of their better durabilities.

The glass monolithic components of the invention present substantial advantages over polymer or polymeric/glass composite components. In particular, these components are not subject to delamination or to dimensional changes linked to aging, temperature or humidity variations, that creates additional losses.

BRIEF DESCRIPTION OF THE DRAWINGS

FIG. 1 shows schematically the molding of an integrated optical connector according to the invention.

FIG. 2 shows the connector with the fibers in position.

FIGS. 3 to 8 are schematic top view of various integrated optical element according to the invention.

DESCRIPTION OF THE PREFERRED EMBODIMENT

FIG. 1 shows the precision molding of a paralelipipedic glass body, for the fabrication of a connector, that includes a V-groove on each of its opposed faces. To clarify the drawing, the size of the V-groove 5 and the angle of the V have been highly exagerated.

The molding apparatus shown in FIG. 1 of EP. A.78658 can be employed. Lower mold 1 and top mold 2 of FIG. 1 hereof, which corresponds to molds 1 and 2 of FIG. 1 of EP. A.78658, present respectively a plane and a plane with small, aligned wedges 3. The molding process forms a glass body 4 having V-grooves 5 at the ends of one surface thereof.

The molded glass body is then submitted to a process that generates a buried optical circuit, the extremities of which are perpendicular to the endfaces of V-grooves 5. To use the optical element as a connector, one must position the fibers to be connected in the V-groove 5 and to immobilize it by appropriate means, for instance by glueing.

By choosing the right dimensions for the V-grooves, and by generating the optical circuit at the right locations, it is easy to position the fibers in coincidence with the optical circuit extremities. The fibers will position themselves on the V-groove. FIG. 2 shows such a connector in operation. In this figure, fibers 7 are located at the ends of buried optical circuit 6.

A useful glass for the fabrication of the glass body 4 is for instance a glass having the following composition in weight %: $SiO_2$: 48%, $Al_2O_3$: 14.2%, $B_2O_3$: 17.4%, $Na_2O$: 2.4%, $K_2O$: 12.6% and F: 5.4%. This glass exhibits a refractive index of 1.465 at the wavelength of the d sodium ray. Starting from this glass, discs, 40 mm in diameter and 3 mm in thickness, are prepared and submitted to the high precision molding process described in EP. A.78658 using the following temperature and pressure cycles:

Heating from ambient to 470° C. at a rate of 10° C./min. without applied pressure.

Holding time at 470° C. for 17 min. without applied pressure.

Holding at 470° C. for 5 min. with a pressure of 110 bars applied on the top mold 2.

Cooling down to 380° C at a rate of 2.5° C./min. while slowly releasing the pressure until no pressure is exerted.

Cooling down to 280° C. at a rate of 5° C./min.

Cooling to ambient temperature at a rate of 20° C./min.

The fabrication of the buried optical circuit is made according to the following example. Using vacuum evaporation, a 3000 Å thick Ti coating is deposited on the top of the glass body 4 that possesses the V-grooves 5. Using classical micro-photolithographic techniques, a channel, 20 micron wide, is generated in the Ti coating. This channel is exactly aligned with the V-groove axis. The Ti-coated face of the glass body is contacted for 3 hrs. with a molten salt bath, at 375° C., having an equimolar composition $AgNO_3$ and $AgCl$, in order to substitute by ion exchange, $Ag^+$ ions for alkaline ions, present in the glass, on the channel surface. This will modify, locally and superficially, the glass refractive index. The glass body is then removed from the molten salt bath and the mask is removed carefully by chemical etching for instance with ammonium bi-fluoride. The rear face of the glass body is coated with a gold electrical conductive coating and the active side is contacted with a molten salt bath containing 83% mole of $KNO_3$ and 17% mole of $NaNo_3$ at 365° C. for 4 hrs. 15 min. At the same time, an electrical field of 33 V/mm is applied between a platinum electrode in the bath and the rear face gold coating of the body. The bath is positively polarized versus the gold coating. This process object is to "bury" the optical circuit and to obtain quasi circular multimode guides 50 microns in diameter located 25 microns under the glass surface. Such a guide has a numercial aperture (N.A) of 0.1 and exhibits losses around 0.06 dB/cm.

It is quite obvious that the dimension of the guide, its N.A. and its "burying" depth etc. are functions of parameters that can be controlled to achieve the desired result. The most critical parameters are:

The nature and the composition of the first ion exchange bath. Instead of $Ag^+$, one can use $Tl^+$ (leading to higher index) or $K^+$ (leading to lower index). Approximately, the index gradient of the guide is proportional to the active ion ($Ag^+$, $Tl^+$, $K^+$ or other) concentration in the first bath.

The width of the initial channels made in the mask.

The presence or the absence of an electrical field during the first exchange. When a field is used, higher index guides are obtained.

The parameters (temperature, time, composition, electrical field) that define the second ion exchange step.

It must be noted that graded index lenses can also be generated by this technique.

The mold used for the high precision molding can be made of tungsten carbide. The top mold presents wedges 3 of triangular section to generate the V-grooves in the glass body. To connect 125 microns diameter optical fibers, each wedge in our example is 257 microns wide and 129 microns tall. Each wedge is 8 mm long. Such a mold can be made by machining on an ultra-precision CNC grinder. Using the device described in FIG. 1 of EP. A.78658, one can achieve an exact negative replica of the wedges in the glass body with tolerances (standard deviation) on the position of better than one micron. Obviously, the dimensions of V-grooves or cavities can be modified for fibers having various diameters.

The mold can be also modified to generate in the glass body other shapes or cavities to position other constituents such as filters, detectors, etc.

FIGS. 3 to 8 illustrate how various components can be made according to the invention.

FIG. 3 shows a coupler-divider including a glass body 4, a buried Y optical circuit 16 and V-grooves 5 at each end of the optical circuit. The angle $\theta$ of the Y branches is about 1° (this angle has been exagerated to clarify the drawing).

FIG. 4 shows a single-mode proximity coupler. In case of single-mode propagation, coupling of energy can occur via evanescent waves, provided the guides are close enough. The coupler includes a glass body 4, two guides 26 with a diameter of 8 microns (N.A.=0.1), buried at 62 microns, being separated by 24 microns in their 6 mm long central parts in order to couple 50% of the energy at 1.3 micron wavelength. V-grooves 5 are included at each guide end to position the fibers.

FIG. 5 illustrates a single-mode coupler/multiplexer. This coupler includes a glass body 4, two linear guides 36 and between the guides 36 a single-mode circular guide 46 forming a resonator loop. The coupling is highly wavelength selective. V-grooves 5 are included at each end to allow fiber positioning.

FIG. 6 shows a multimode coupler-multicomplexer. It includes a glass body 4, a first buried graded index lens 40 obtained by the double exchange technique, an interference filter 41 deposited on a thin plate positioned in a groove obtained during body 4 molding and a second graded index lens 42. Lenses 40 and 42 are 2.1 mm long, 500 microns in diameter and show a parabolic index gradient of 0.025. V-grooves 5 are also included for fiber positioning.

FIG. 7 shows an integrated optical element for aligning a single-mode optical fiber with a collimating lens. This is useful for "collimated beam" or "expanded beam" single-mode connectors or for coupling light from a semi-conductor laser to a single-mode fiber. This element includes a glass body 4 in which a buried graded index lens 50 has been generated by the double ion exchange technique. A V-groove 5 allows the exact positioning of the fiber on the optical axis of lens 50.

FIG. 8 shows a multimode monitor. It includes a main guide 60 with a V-groove 5 at each end. A branch 61 allows the tapping of about 10% of the power passing in guide 60. The branch 61 becomes enlarged and leads to a cavity, made during the molding of the glass body 4, in which a photo detector 62 is placed.

It is obvious that the described mode of implementation includes examples that could be modified, in particular by technical equivalent substitution, without departing from the framework of the invention.

We claim:

1. An integrated optical component comprising
a monolithic glass body,
at least one cavity molded into a surface of said glass body, and
an optical circuit path formed in said surface by ion exchange, said path comprising the same constituents as said glass body and further including ions that increase the refractive index thereof to a value greater than that of said glass body, said path terminating at and being aligned with said cavity, whereby an optical device situated in said cavity is optically aligned with said circuit path.

2. A component in accordance with claim 1 wherein said glass body comprises fluorine.

3. A component in accordance with claim 1 wherein said glass is a fluoroborosilicate glass.

4. A component in accordance with claim 1 wherein said cavity is a V-groove.

5. A component in accordance with claim 4 wherein said V-groove has an optical quality endface adjacent said circuit path, said endface being substantially perpendicular to the axis of said path at said endface.

6. A component in accordance with claim 1 wherein said body is formed of a glass having a softening point temperature less than 500° C.

7. A method of making an integrated optical component comprising
molding a glass monolithic body having at least one cavity in a surface thereof, and
generating in said surface in alignment with said cavity by the ion exchange technique an optical circuit path, one end of which is in alignment with said cavity, whereby an optical device that is positioned in said cavity will be optically aligned with respect to said circuit path.

* * * * *